(12) United States Patent
Black

(10) Patent No.: US 8,811,802 B2
(45) Date of Patent: *Aug. 19, 2014

(54) INSERTION AND USAGE OF METADATA IN DIGITAL VIDEO

(75) Inventor: David Robert Black, Sunnyvale, CA (US)

(73) Assignee: Aplle, Inc., Cupertino, CA (US)

(*) Notice: Subject to any disclaimer, the term of this patent is extended or adjusted under 35 U.S.C. 154(b) by 183 days.

This patent is subject to a terminal disclaimer.

(21) Appl. No.: 13/323,795

(22) Filed: Dec. 12, 2011

(65) Prior Publication Data

US 2012/0148214 A1 Jun. 14, 2012

Related U.S. Application Data

(63) Continuation of application No. 10/732,609, filed on Dec. 9, 2003, now Pat. No. 8,135,261.

(51) Int. Cl.
*H04N 5/93* (2006.01)

(52) U.S. Cl.
USPC ........................................... 386/284

(58) Field of Classification Search
USPC ................... 386/248, 278, 284, 232
See application file for complete search history.

(56) References Cited

U.S. PATENT DOCUMENTS

| | | | |
|---|---|---|---|
| 5,329,309 A * | 7/1994 | Dorricott et al. ............ 348/97 |
| 5,640,202 A | 6/1997 | Kondo et al. | |
| 5,649,048 A | 7/1997 | Tomita et al. | |
| 5,677,738 A | 10/1997 | Mizutani et al. | |
| 5,706,290 A | 1/1998 | Shaw et al. | |
| 5,745,643 A | 4/1998 | Mishina | |
| 5,754,248 A | 5/1998 | Faroudja | |
| 5,832,085 A | 11/1998 | Inoue et al. | |
| 5,999,220 A | 12/1999 | Washino | |
| 6,034,746 A | 3/2000 | Desai et al. | |
| 6,134,380 A | 10/2000 | Kushizaki | |

(Continued)

FOREIGN PATENT DOCUMENTS

| | | |
|---|---|---|
| EP | 1081949 | 3/2001 |
| WO | WO 93/15586 | 8/1993 |
| WO | WO 93/23954 | 11/1993 |
| WO | WO 94/01971 | 1/1994 |

OTHER PUBLICATIONS

Portions of prosecution history of U.S. Appl. No. 10/732,609, Feb. 6, 2012, Black, David Robert.

(Continued)

*Primary Examiner* — David Harvey
(74) *Attorney, Agent, or Firm* — Adeli LLP

(57) ABSTRACT

Some embodiments provide a method of capturing digital video. According to this method, the digital video is received at a first rate. The received digital video includes metadata. The method uses the metadata to store the digital video at a second rate that is different from the first rate. In some embodiments, the first rate is an encoded rate, while the second rate is the digital video's native shooting rate. The digital video's native shooting rate can be any arbitrary rate up to, but not including, the encoded rate. Some embodiments provide a method of outputting digital video from a computer. From a storage structure of the computer, this method retrieves a video clip. In this video clip, the method embeds a metadata structure and records a set of metadata in this structure. The method then outputs the video clip with the embedded metadata.

21 Claims, 9 Drawing Sheets

(56) References Cited

U.S. PATENT DOCUMENTS

| | | | |
|---|---|---|---|
| 6,144,412 A | 11/2000 | Hirano et al. | |
| 6,370,198 B1 | 4/2002 | Washino | |
| 6,441,860 B1* | 8/2002 | Yamaguchi et al. | 348/555 |
| 6,523,046 B2 | 2/2003 | Liu et al. | |
| RE38,079 E | 4/2003 | Washino et al. | |
| 6,542,198 B1 | 4/2003 | Hung et al. | |
| 6,549,922 B1 | 4/2003 | Srivastava et al. | |
| 6,658,056 B1 | 12/2003 | Duruöz et al. | |
| 6,898,799 B1 | 5/2005 | Jarman | |
| 7,023,486 B2 | 4/2006 | Takayama | |
| 7,206,025 B2 | 4/2007 | Choi | |
| 7,383,497 B2 | 6/2008 | Glenner et al. | |
| 7,457,532 B2 | 11/2008 | Barde et al. | |
| 7,580,614 B2 | 8/2009 | Tsumagari et al. | |
| 7,683,940 B2 | 3/2010 | Fleming | |
| 7,738,550 B2 | 6/2010 | Kuhn | |
| 7,827,312 B2* | 11/2010 | Ramaswamy et al. | 709/246 |
| 8,041,186 B1 | 10/2011 | Black | |
| 8,064,752 B1 | 11/2011 | Black | |
| 8,135,261 B1* | 3/2012 | Black | 386/284 |
| 8,296,801 B2* | 10/2012 | Takagi et al. | 725/44 |
| 2002/0118296 A1 | 8/2002 | Schwab et al. | |
| 2003/0028890 A1 | 2/2003 | Swart et al. | |
| 2003/0206242 A1* | 11/2003 | Choi | 348/441 |
| 2004/0049797 A1* | 3/2004 | Salmonsen | 725/132 |
| 2004/0057704 A1* | 3/2004 | Katsuo et al. | 386/125 |
| 2004/0060009 A1 | 3/2004 | Jung et al. | |
| 2004/0064207 A1 | 4/2004 | Zacks et al. | |
| 2004/0086265 A1 | 5/2004 | Tojo et al. | |
| 2004/0096110 A1* | 5/2004 | Yogeshwar et al. | 382/239 |
| 2004/0170374 A1 | 9/2004 | Bender et al. | |
| 2004/0257434 A1 | 12/2004 | Davis et al. | |
| 2005/0076039 A1 | 4/2005 | Ludwig et al. | |
| 2005/0078186 A1 | 4/2005 | Kreiner et al. | |
| 2006/0242325 A1 | 10/2006 | Ramaswamy et al. | |
| 2011/0317978 A1 | 12/2011 | Black | |
| 2011/0317985 A1 | 12/2011 | Black | |
| 2012/0002948 A1 | 1/2012 | Black | |
| 2012/0093216 A1 | 4/2012 | Black | |

OTHER PUBLICATIONS

Portions of prosecution history of U.S. Appl. No. 10/732,708, Oct. 17, 2011, Black, David Robert.

\* cited by examiner

INSERTION AND USAGE OF METADATA IN DIGITAL VIDEO

CLAIM OF BENEFIT TO PRIOR APPLICATIONS

This Application is a continuation application of U.S. patent application Ser. No. 10/732,609, filed Dec. 9, 2003, now issued as U.S. Pat. No. 8,135,261. U.S. patent application Ser. No. 10/732,609, now issued as U.S. Pat. No. 8,135, 261, is incorporated herein by reference.

FIELD OF THE INVENTION

The present invention is directed towards insertion and usage of data in digital video.

BACKGROUND OF THE INVENTION

When first introduced, the mini digital video ("MiniDV") format was truly revolutionary, not only in its treatment of the storage of video/audio media, but also in the transport used to move media between devices. With a digital tape format, timecode was no longer relegated to special purpose control tracks, but carried along with the relevant video and audio data in a cohesive frame based unit. A pure digital connection over a FireWire port allowed for data to be transferred between devices with no information loss. Beyond simple timecode, extra space was set aside in each frame to carry other types of useful embedded "metadata," including such information as camera configuration/exposure settings, time of day, scene breaks, etc. Support for embedded data has been provided by more expensive formats for many years (e.g. SDI), but the low cost of DV/FireWire devices has greatly expanded its use to a wide range of users and hardware configurations.

In many modern non-linear editors (NLE's), most of this auxiliary information is ignored. Digital video (DV) is usually treated like any other analog based format, simply substituting FireWire driver modules for a specialized video IO board and serial port connection. While this has the advantage of allowing an existing product to support DV in a relatively painless manner, it prevents more advanced users from making use of this additional information during the editing process. This is somewhat ironic in that the use of embedded data has only grown since the format's introduction, expanding to carry such things as film pull-down cadence and logging notes. Forthcoming high definition (HD) formats are being based on the same concepts as well, with even more space allocated for custom embedded data.

One example of metadata that is currently ignored is a video's native frame rate (i.e., the rate that the video was originally shot). The native frame rate of film is typically 24 fields per second (fps). Some cameras store video at 30 fps, even though they shoot the video at 24 fps. Some of these cameras (e.g., the Panasonic DIVX100) embed the native shooting rate within each frame that they store.

When NLE's receive a video clip from another device (such as a camera or a tape deck), they typically ignore the embedded native shooting rate. However, for editing purposes, the NLE's typically convert the 30 fps video to a 24 fps video clip, because otherwise the edited video might contain artifacts. To convert the 30 fps video to a 24 fps video, existing NLE's use a variety of inefficient manual techniques. For instance, some NLE's require their users to enter the encoding cadence, where, in this example, the encoding cadence refers to the encoding technique used to map a 24 fps video to a 30 fps video. Some of these NLE's then have their users identify manually the first frame, while others use a timecode-technique that identifies the frames based on the embedded timecode. Requiring users to enter the encoding cadence is at times impractical, as the users might not know this cadence. Also, requiring the users to manually identify the first frame is inefficient since the user has to scroll through the video and identify the appropriate frame. In addition, the timecode-techniques for identifying the frame ID's can lead to inaccurate results when the timecode is not accurate. Therefore, there is a need in the art for capturing digital video efficiently by examining the metadata embedded in the digital video. There is also a need for a video-editing method that converts video, which it edits at the video's native shooting rate (e.g., 24 fps), back to another rate (e.g., 30 fps) when it comes time to output the video.

Another problem with captured digital video is inconsistency in the metadata formats of different digital-video devices of different manufacturers. While the details of the media encoding/storage are fixed by the DV specification, the exact structure and makeup of the embedded data regions of the DV frame are left open to interpretation. Due to this, various manufacturers will store different types of data in different locations. For example, Sony DVCam fills nearly all of the empty subcode blocks in VAUX with timecodes for redundancy, while Panasonic DVCPro equipment leaves these regions empty, but defines a specific location for shooting rate information. Previously, this has only been an issue for extremely poor implementations on the part of deck/camera manufacturers, with devices behaving badly when receiving a DV stream from a different deck. While most of these problems have been solved in the simple cases, issues still exist when attempting to make use of embedded data in an output stream from a computer or another device.

By default, most DV decks will regenerate the embedded data (timecode, etc . . . ) in a DV frame on record. This prevents an application or user from making use of this data to set parameters that may not be natively supported by a device. Many of the newer, semi-professional DV devices will optionally leave this embedded data alone, recoding the bitstream to tape as the deck receives it. However, problems appear later when the deck tries to play the recorded tape, and has problems due to various bits of embedded data either not being preset, or being stored in unexpected locations.

One prior NLE uses a crude technique to encode a certain type of metadata in a DV stream that they output. This prior technique checks for timecode and/or animorphic-bit slots in the metadata of a DV stream that it is outputting. If this technique finds such slots, it records the timecode and/or animorphic bit information in these slots. This technique does not record timecode or animorphic bit data when it does not find slots in the metadata for such information.

Therefore, there is a need for a metadata-encoding method that encodes metadata in an outgoing digital video frame. For a robust implementation of embedded data support, there is also a need for a method that can modify the structure of, or add a new structure for, the embedded and auxiliary data regions in outgoing DV frames.

SUMMARY OF THE INVENTION

Some embodiments provide a method of capturing digital video. According to this method, the digital video is received at a first rate. The received digital video includes metadata. The method uses the metadata to store the digital video at a second rate that is different from the first rate. In some embodiments, the first rate is an encoded rate, while the second rate is the digital video's native shooting rate (i.e., the rate that a camera originally shot the digital video). The digital video's native shooting rate can be any arbitrary rate up to, but not including, the encoded rate. Examples of the second native rate include (1) 24 fps for an encoded 25 or 30 fps video stream, (2) 30 fps for an encoded 60 fps video stream, (3) 42 fps for an encoded 60 fps video stream, etc.

Some embodiments provide a method of outputting digital video from a computer. From a storage structure of the computer, this method retrieves a video clip. In this video clip, the method embeds a metadata structure and records a set of metadata in this structure. The method then outputs the video clip with the embedded metadata.

Some embodiments provide a method of processing digital video in a computer. The method receives a first video clip. It stores the first video clip at a first rate in a storage of the computer. From the first video clip, the method generates a second video clip that is at a second rate different than the first rate. The method then outputs the second video clip from the computer. In some embodiments, the first rate is the native rate that a camera originally shot at least a portion of the first video clip, and the second rate is an encoded rate. In some embodiments, the method generates the second video clip from the first video by using the 2:3:3:2 encoding format. Also, in some embodiments, the method outputs the second video clip as the method generates the second video clip.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Digital Video Capture

Some embodiments provide a method of capturing digital video. According to this method, the digital video is received at a first rate. The received digital video includes metadata. The method uses the metadata to store the digital video at a second rate that is different from the first rate.

Figure 1:
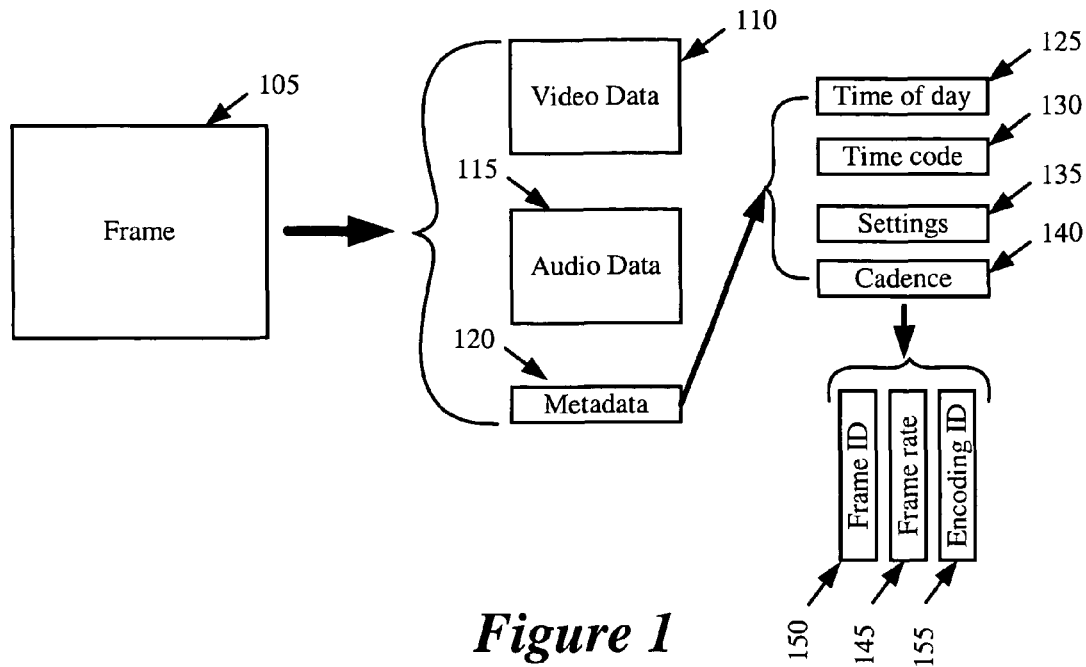
FIG. 1 conceptually illustrates the contents of a digital-video frame in some embodiments.

The metadata can be stored differently in the received digital video stream. In some cases, the metadata is stored within each digital-video frame of a digital video stream. FIG. 1 conceptually illustrates the contents of a digital-video frame 105 in some of these embodiments. As shown in this figure, the digital-video frame 105 includes video data 110 and audio data 115 for the frame. It also includes metadata 120 for the frame. The metadata can include a variety of ancillary data, such data as time of day 125, timecode 130, camera settings 135, encoding cadence 140, etc. The encoding cadence 140 can provide encoding information about how the current digital video stream was obtained from a prior digital video stream (referred to below as the "original" digital video stream). In other words, the encoding cadence could be used to specify the mapping that was used to map frames from the original digital video stream to the current digital video stream.

FIG. 1 illustrates that in some embodiments the encoding cadence provides a rate 145, an identifier 150, and an encoding identifier 155. The rate 145 is the native shooting rate of the original digital video stream. The frame identifier 150 identifies the location of the frame in a particular sequence of frames that is associated with the encoding cadence. The encoding identifier 155 identifies the type of encoding, if any, that was used to map the video stream from one rate to another.

Figure 2:
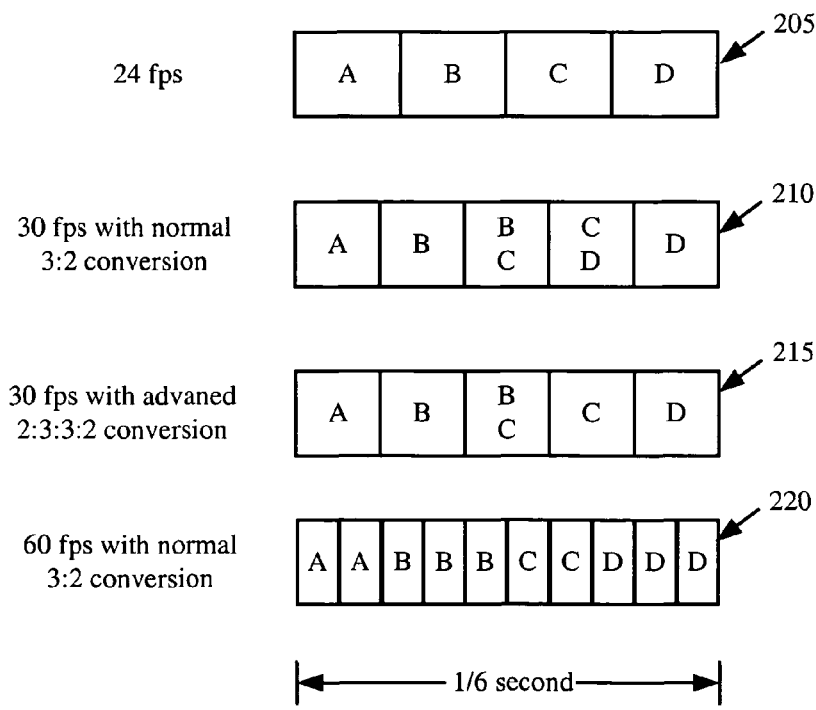
FIG. 2 illustrates several examples of encoding schemes.

FIG. 2 presents an example that illustrates frame rates, frame identifiers, and encoding identifiers. Specifically, this figure illustrates a first sequence 205 of four frames A, B, C, and D that are recorded at a rate of 24 fps. This figure further illustrates two mappings of this four-frame sequence to two different five-frame sequences 210 and 215, which are each at 30 fps.

The five-frame sequence 210 is generated by a "normal 3:2" encoding scheme. As shown in FIG. 2, the normal 3:2 encoding scheme converts the four frames A, B, C, and D, into five frames, with the first, second, and fifth frames being frames A, B, and D, and the third and fourth frames being a combination of a field in the B frame (i.e., a B field) and a field in the C frame (i.e., a C field), and a C field and a field in the D frame (i.e., a D field), respectively.

The five-frame sequence 215, on the other hand, is generated by an "advanced 2:3:3:2" encoding scheme. As shown in FIG. 2, the advanced 2:3:3:2 encoding scheme converts the four frames A, B, C, and D, into five frames, with the first, second, fourth, and fifth frames being frames A, B, C, and D, and the third frame being a combination of a B field and a C field.

For the two 30-fps encoding schemes shown in FIG. 2, a five-value frame identifier can be used to uniquely identify each frame in the five-frame sequences. In other words, the frames in either five-frame sequence 210 or 215 can be numbered from 0 to 4. Under this approach, a frame ID of 2 specifies a B/C mixed frame in either five-frame sequence 210 or 215, whereas a frame ID of 3 specifies a C/D mixed frame in the sequence 210 while specifying a C frame in the sequence 215. Even though FIG. 1 illustrates that the encoding cadence can be expressed in terms of a frame identifier and a frame rate, one of ordinary skill will realize that other embodiments might express the encoding cadence in a different manner.

FIG. 2 also illustrates the mapping of the four-frame sequence 205 into a 10-frame 720 p sequence 220, which is at 60 fps. This mapping is performed by using a normal 3:2 conversion scheme. This scheme converts the four frames A, B, C, and D into ten frames, where the first two are frame A, the next three are frame B, the next two are frame C, and the last three are frame D. To specify such an encoding scheme, some embodiments use an encoding cadence that is different than the encoding cadence 140 illustrated in FIG. 1. These embodiments use an encoding cadence that specifies the native shooting rate 145 of the video and a flag that specifies whether the frame is a duplicate of a previously supplied frame.

Figure 3:
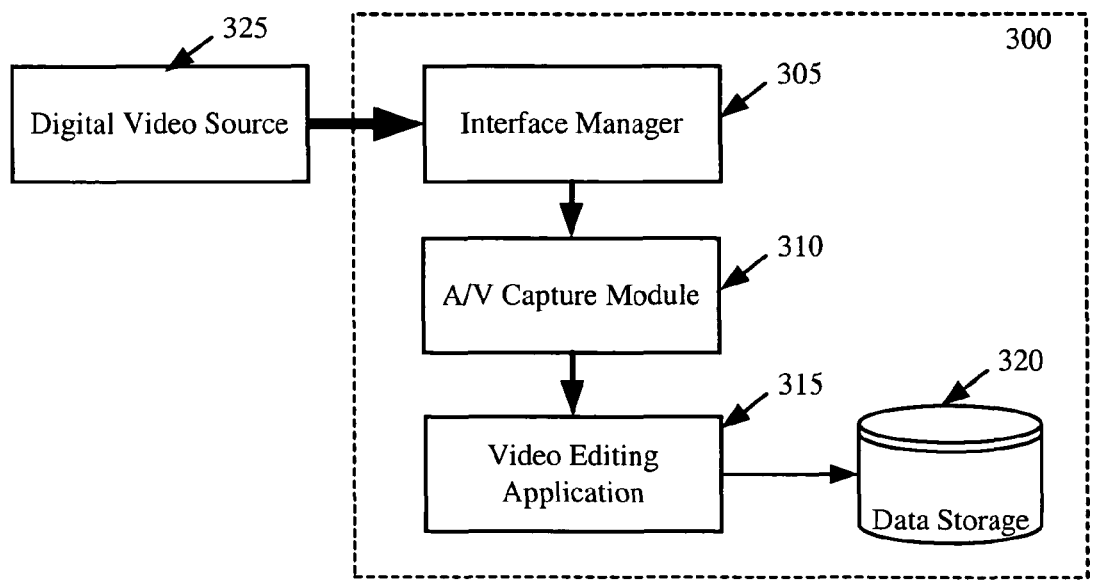
FIG. 3 illustrates the software architecture of a computer system used to capture digital video according to some embodiments of the invention.

FIG. 3 illustrates the software architecture of a computer system 300 used to capture digital video according to some embodiments of the invention. The computer system 300 includes an interface manager 305, an audio/video capture module 310, a video editing application 315, and data storage 320. As shown in FIG. 3, the interface manager 305 receives a digital video stream from a digital video source 325 (such as a camera or tape deck). In some embodiments, the interface manager is a Firewire input driver that receives the video stream through a Firewire port of the computer system 300 that is connected to the digital video source through a Firewire cable.

The interface manager 305 relays the received video stream to the a/v capture module 310, which basically funnels the video stream from the low-level port manager to the video editing application. In some embodiments, this capture module is part of the QuickTime® Engine of Apple Computer, Inc.

The video editing application 315 stores the video stream that it receives from the capture module 310 in the data storage 320. In some cases, the video editing application stores the video stream at a different rate than the rate that it receives the video stream. For instance, when the editing application receives the video stream at a first rate and the metadata within the received video data stream indicates that the video was originally shot at a second rate, the video editing application stores the video stream at the second rate.

Figure 4:
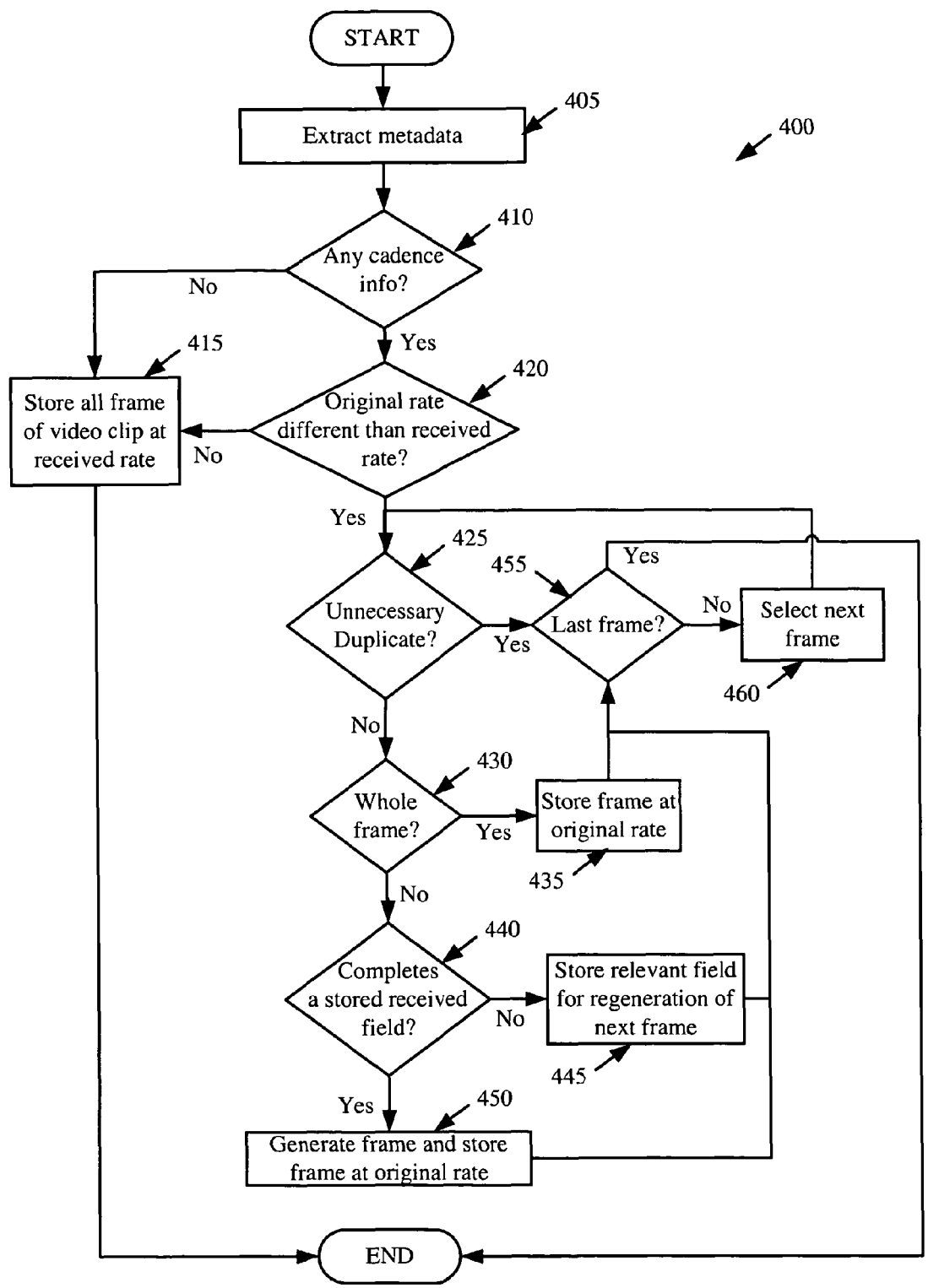
FIG. 4 illustrates a process that the editing application uses to store a digital-video frame of a digital video stream.

FIG. 4 illustrates a process 400 that the editing application 315 uses to store a digital video stream. This process is performed for a digital video stream (1) that has each frame organized in the manner illustrated in FIG. 1, and (2) that is potentially encoded according to the encoding schemes illustrated in FIG. 2.

As shown in FIG. 4, the process 400 initially extracts (at 405) the metadata from the first frame in the received digital video frame. It then determines (at 410) whether the extracted metadata includes any encoding cadence data. If not, the process stores (at 415) the first received frame, and all subsequent frames in the received video stream, at the received frame rate in the data storage 320. The received frame rate is different in different embodiments. For instance, the received frame rate might be 60 fps, 30 fps, 25 fps, or some other rate. After 415, the process 400 ends.

If the process 400 determines (at 410) that the extracted metadata includes cadence data, it then determines (at 420) whether the cadence data specifies a different rate than the rate at which the video stream is currently being received (i.e., whether the frame rate 145 in the metadata 120 is different than the received frame rate). If not, the process stores (at 415) the first received frame, and all subsequent frames in the received video stream, at the received rate in the data storage 320 and then ends.

When the process determines (at 420) that the cadence data specifies a different rate, the process determines (at 425) whether the "current frame" is an unnecessary duplicate, where the current frame is the first frame in the received video stream the first time the process reaches 425, or is, for each subsequent time that the process reaches 425, a frame selected at 460, which will be further described below. The process makes this determination based on the encoding cadence of the received frame. For instance, when the received video is encoded according to one of the 30 fps encoding scheme illustrated in FIG. 2, a frame is an unnecessary duplicate frame when the encoding identifier specifies an advanced 2:3:3:2 encoding and the frame ID equals 2. A frame is never an unnecessary duplicate when the encoding identifier specifies the normal 3:2 encoding. Alternatively, when the received video is encoded according to the 60 fps 720 p encoding scheme illustrated in FIG. 2, the process determines that a frame is an unnecessary duplicate when the duplicate flag in the encoding cadence is set, while it determines that the frame is not an unnecessary duplicate when this flag is not set.

If the process determines (at 425) that the current frame is an unnecessary duplicate, it determines (at 455) whether it has examined all the frames of the received video stream. If so, the process ends. Otherwise, the process selects (at 460) the next frame in the received video stream, and transitions back to 425, which was described above.

When the process determines (at 425) that the current frame is not an unnecessary duplicate, the process determines (at 430) whether the frame is a whole frame. Again, the process makes this determination based on the encoding cadence of the received frame. The frames 0, 1, and 4 are whole frames when the normal 3:2 encoding scheme is used and frames 0, 1, 3, and 4 are whole frames when the advanced 2:3:3:2 encoding scheme is used. When the 60 fps 720 p encoding scheme is used, each frame is a whole frame.

When the process determines (at 430) that a frame is a whole frame, it stores (at 435) the frame in the data storage at its native rate (e.g., at 24 fps), and then transitions to 455, which was described above. On the other hand, when the process determines (at 430) that the frame is a mixed frame (which will be the case when the process encounters frame 2 or 3 of a normal 3:2 encoded 30 fps video stream), the process determines (at 440) whether one of the fields (e.g., the C field) of the received frame completes a previously stored field (e.g., a previously stored C field). If not, the process stores (at 445) the relevant field of the current frame, and transitions to 455, which was described above. For instance, when the process receives frame 2 of a 30 fps 3:2 encoded video stream, the current frame's C field is the first C field. Hence, at 445, the process stores this C field of the current frame, discards the B field of this frame, and then transitions to 455.

When the process determines (at 440) that one of the fields (e.g., the C field) of the received frame completes a previously stored field (e.g., a previously stored C field), the process (at 450) (1) generates a frame by combining a relevant field of the current frame with a previously stored field, (2) stores this generated frame at the native frame rate (e.g., 24 fps), and then (3) transitions to 455, which was described above. For instance, when the process receives frame 3 of a 30 fps 3:2 encoded video stream, the C field of the received frame completes a previously stored C field. Accordingly, at 450, the process generates the C frame by combining the current frame's C field with the previously stored C field, stores this generated C frame at the native frame rate (e.g., 24 fps), and then transitions to 455.

While storing each digital video frame, the video editing application also stores the metadata that accompanies the frame. The video editing application stores the metadata differently in different embodiments. For instance, in some embodiments that are implemented on an OS X® platform of Apple Computers, Inc., the video editing application can leave the original frame completely intact inside a Quicktime wrapper, such that the metadata is left in place in its original position. The video editing application can also extract the metadata elements and store them in parallel in the same container file (e.g., Quicktime file) that it uses to store the extracted audio/video data.

II. Digital Video Output

Some embodiments provide a method of outputting digital video from a computer. From a storage structure of the computer, this method retrieves a video clip. In this video clip, the method embeds a metadata structure and records a set of metadata in this structure. The method then outputs the video clip with the embedded metadata. In some embodiments, the embedded set of metadata includes the digital video's encoding cadence, time of day, and/or camera setting.

Figure 5:
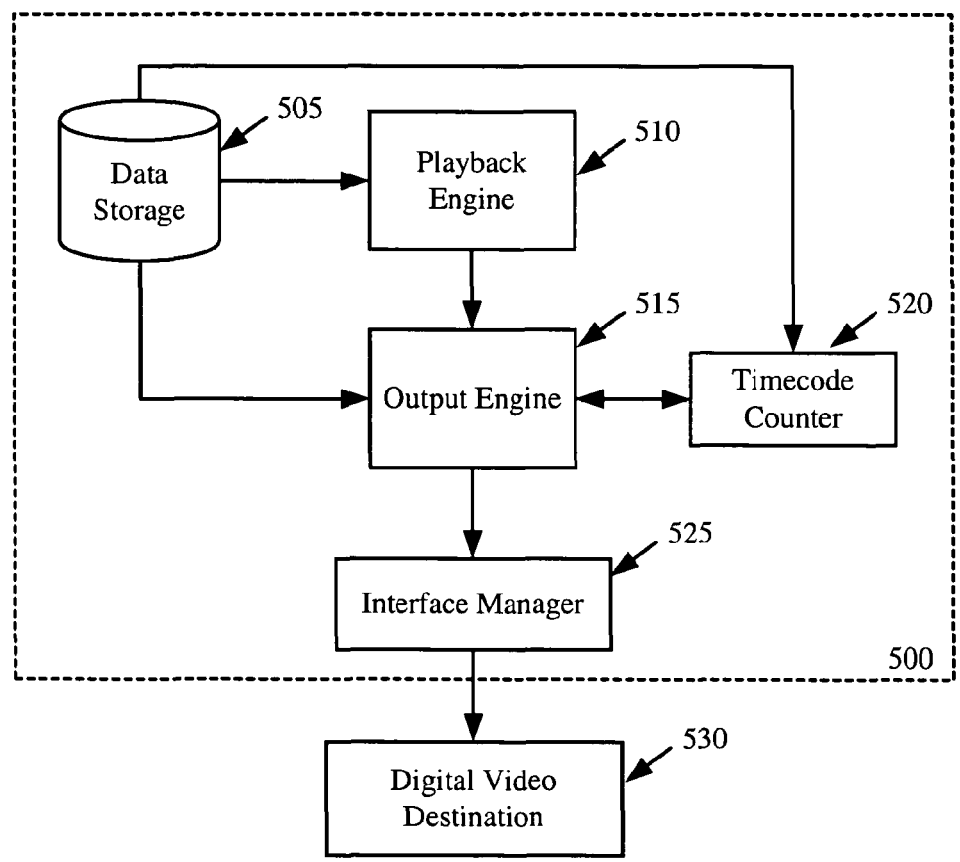
FIG. 5 illustrates the software architecture of a computer system used to output digital video according to some embodiments of the invention.

FIG. 5 illustrates the software architecture of a computer system 500 used to output digital video according to some embodiments of the invention. The computer system 500 includes a data storage 505, a playback engine 510, an output engine 515, a timecode counter 520, and an interface manager 525. As shown in FIG. 5, the data storage 505 stores one or more digital video clips that might have been edited by a video editing application of the computer system 500. Each digital video clip might be formed by one or more video clips. Each video clip can have one or more audio tracks. Also, each video clip could have been produced by adding video effects to its clip(s) and/or audio effects to its audio track(s). The data storage 505 also stores metadata that is associated with each video clip.

The playback engine 510, output engine 515, and timecode counter 520 are part of a video editing application in some embodiments. The playback engine 510 retrieves video clips from the data storage 505. In some embodiments, the playback engine 510 determines whether the rate of a retrieved video clip equals a particular rate. If not, the playback engine 510 transforms the retrieved video clip to another video clip at another rate. The operation of the playback engine 510 will be further described below by reference to FIGS. 6A and 6B.

The playback engine supplies the retrieved or transformed video clip to the output engine 515. The output engine 515 encodes metadata in the video clip that it receives from the playback engine. In some embodiments, this engine encodes the following metadata in the video frames: timecode, aspect ratio, and encoding cadence (e.g., the native frame rate, frame identifier, and encoding identifier for the 30-fps encoding schemes illustrated in FIG. 2, and the native frame rate and duplicate flag for the 60-fps encoding scheme illustrated in FIG. 2). To encode the timecode, the output engine works with the timecode counter 520. The operation of the output engine 515 and the counter 520 will be further described below by reference to FIG. 7. The output engine provides the video stream that it encodes to the interface manager 525, which then outputs this stream to a digital-video destination 530 (e.g., a camera or tape deck). In some embodiments, the interface manager 525 is a Firewire output driver that outputs the video stream through a Firewire port that is connected to the digital video destination 530 through a Firewire cable.

Figure 6A:
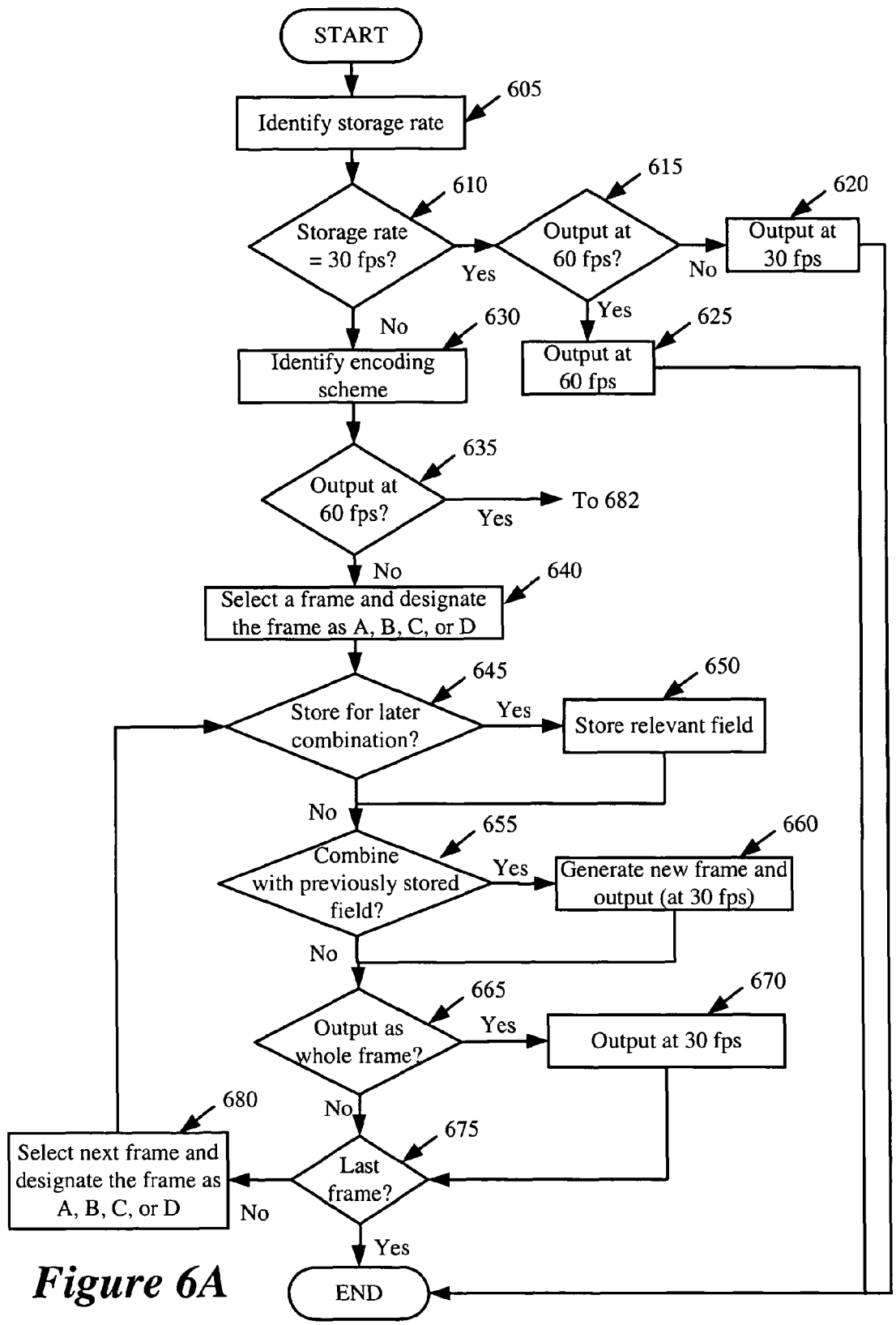
FIGS. 6A and 6B illustrate a process that a playback engine of the computer system of FIG. 5 performs to output a video clip.
Figure 6B:
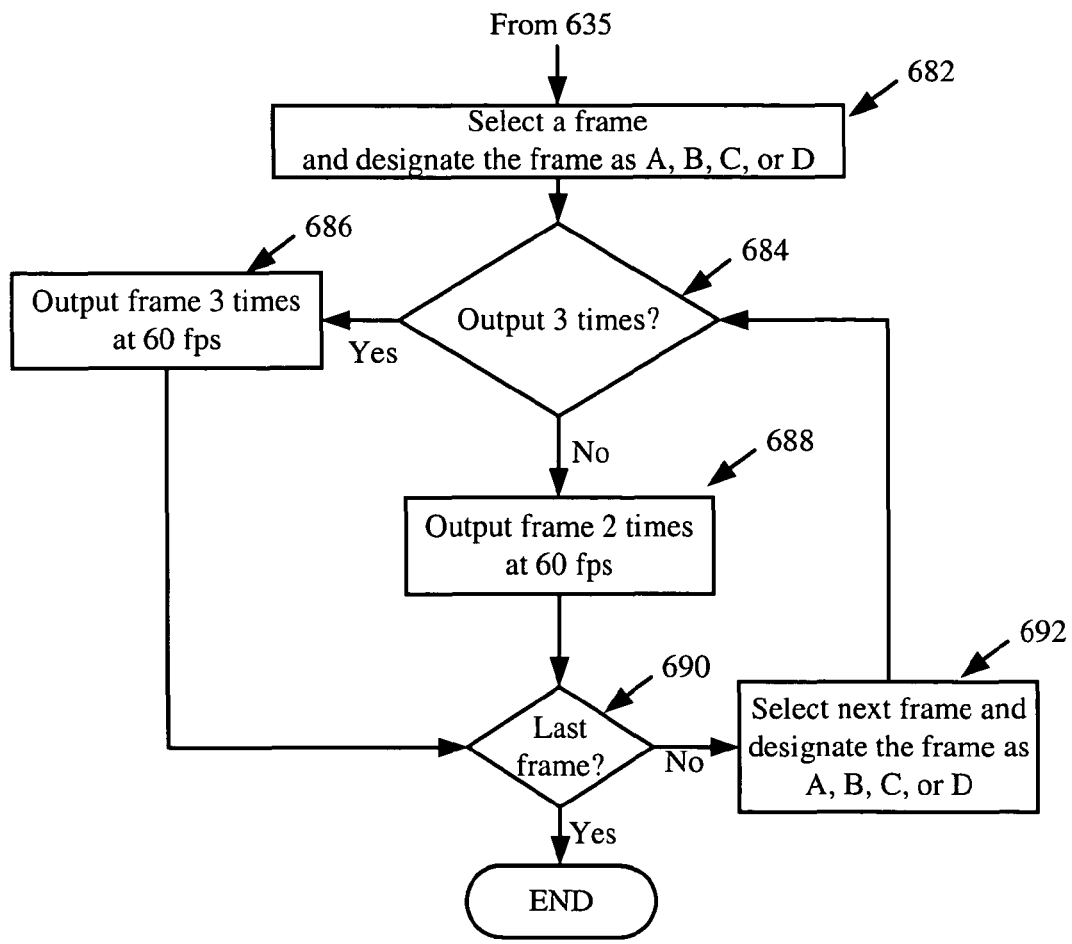

For some embodiments of the invention, FIGS. 6A and 6B illustrate a process 600 that the playback engine 510 performs to output a video clip. In the embodiment illustrated in FIGS. 6A and 6B, the playback engine can output a digital video stream at 30 or 60 fps, when the digital video stream is originally stored at 24 or 30 fps in the data storage 505. However, one of ordinary skill will realize that in other embodiments, the playback engine outputs a digital video stream at 30 or 60 fps, when the digital video stream is originally stored in the data storage 505 at a rate different than 24 or 30 fps (e.g., at a rate from 4 to 29 fps when outputting digital video at 30 fps, or at a rate from 4 to 59 fps when outputting digital video at 60 fps).

From the data storage 505, the process 600 initially retrieves (at 605) the storage rate of the video clip that it is outputting. This rate might have been automatically stored in the data storage during the capture of the video clip or it might have been manually set by an editor during the editing of the video clip. For the embodiments illustrated in FIGS. 6A and 6B, the storage rate of the video clip might be 24 or 30 fps, although this rate might be different in other embodiments as mentioned above.

After 605, the process 600 determines (at 610) whether the storage rate is 30 fps. If so, the process determines (at 615) whether it needs to output the video at 60 fps. In some embodiments, the process outputs video at 30 fps, for instance, when it outputs an NTSC DV25 or DV50 video stream or an HDTV DV100 1080i video stream. For all such video streams, the process outputs each frame as a pair of fields, an odd field and an even field.

In some embodiments, an editor specifies the rate that the computer system 500 needs to output a video stream. Accordingly, in these embodiments, the process 600 makes its determination at 615 based on the editor's setting regarding the output rate. If the process determines (at 615) that it needs to output video at 30 fps, it transitions to 620, where it outputs all frames of the video clip at 30 fps. After 620, the process ends. On the other hand, if the process determines (at 615) that it needs to output the video at 60 fps, it transitions to 625, where it outputs the video at 60 fps by outputting each frame of the video twice. After 625, the process ends.

If the process determines (at 610) that the storage rate of the video clip is 24 fps, it identifies (at 630) the encoding scheme that it needs to use to convert the 24 fps video to a 30 fps video. In some embodiments, the process identifies (at 630) the encoding scheme from an encoding setting specified by the editor.

After 630, the process determines (at 635) whether it has to output the video stream at 60 fps. If not, the process selects (at 640) the first frame of the video clip. Each time the process selects a frame (at 640 or at 680, which is further described below), the process designates the frame as an A frame, B frame, C frame, or D frame. The process steps through these designations sequentially, and when it reaches the D frame, it starts back with the A frame (i.e., after designating a frame as a D frame, the process designates the next selected frame as an A frame). In some embodiments, the designation for the first frame is dependent on the metadata (e.g., the frame identifier) stored with the frame that identifies the frame type.

Next, at 645, the process 600 determines whether it needs to store a field of the selected frame for combination with the field of a later frame. The process makes this determination based on the designation specified at 640 or 680 (which will be described below) and the encoding scheme identified at 630. When the process outputs a 24 fps video clip at 30 fps according to the normal 3:2 encoding scheme, the process stores a B field and a C field for later combination with respectively a C field and a D field. On the other hand, when the process outputs a 24 fps video clip at 30 fps according to an advanced 2:3:3:2 encoding scheme, the process only stores a B field for later combination with a C field.

When the process determines (at 645) that it does not need to store a field of the selected frame, it transitions to 655, which will be described below. However, when the process determines (at 645) that it needs to store a field of the selected frame, it stores (at 650) the relevant field of the selected frame and then transitions to 655.

At 655, the process determines whether a field of the selected frame needs to be combined with a field previously stored by the process 600. The process makes this determination based on the frame designation specified at 640 or 680 and the encoding scheme identified at 630. When the process outputs a 24 fps video clip at 30 fps according to the normal 3:2 encoding scheme, the process combines a C field and a D field respectively with a previously stored B field and C field. On the other hand, when the process outputs a 24 fps video clip at 30 fps according to an advanced 2:3:3:2 encoding scheme, the process combines a field in the C frame with a previously stored B field.

When the process determines (at 655) that it does not need to combine a field of the selected frame with a previously stored field, it transitions to 665, which will be described below. However, when the process determines (at 655) that it needs to combine a field of the selected frame with a previously stored field, it associates (at 660) the relevant field of the selected frame with the previously stored field, outputs the associated fields as a frame at 30 fps, and then transitions to 665.

At 665, the process determines whether it needs to output the selected frame (i.e., the frame last selected at 640 or 680) as a whole frame. The process makes this determination based on the frame designation specified at 640 or 680 and the encoding scheme identified at 630. In the encoding schemes illustrated in FIG. 2, only a C frame would not be output as a whole frame when a normal 3:2 conversion scheme is used. If the process determines (at 665) that it needs to output the selected frame in its entirety, the process outputs (at 670) the selected frame at 30 fps, and then transitions to 675. The process also transitions to 675 when it determines (at 665) that it does not need to output the selected frame as a whole frame.

At 675, the process determines whether it has examined all the frames of the video clip. If so, the process ends. Otherwise, the process (at 680) selects the next frame and designates the frame as an A, B, C, or D frame. The process then transitions to 645, where it repeats the above-described operations 645-675.

When the process 600 determines (at 635) that it has to output the video at 60 fps, the process (at 682) selects the first frame of the video clip and designates the frame as an A, B, C, or D frame. Based on this designation, the process then determines (at 684) whether it needs to output the frame two times or three times. If the process determines (at 684) that it has to output the selected frame three times, the process outputs (at 686) the selected frame three times at 60 fps and then transitions to 690, which will be described below. Otherwise, the process outputs (at 688) the selected frame two times at 60 fps and then transitions to 690. At 690, the process determines whether it has examined all the frames of the video clip. If so, the process ends. Otherwise, the process (at 692) selects the next frame and designates the frame as an A, B, C, or D frame. The process then transitions to 684, where it repeats the above-described operations 684-690.

Figure 7:
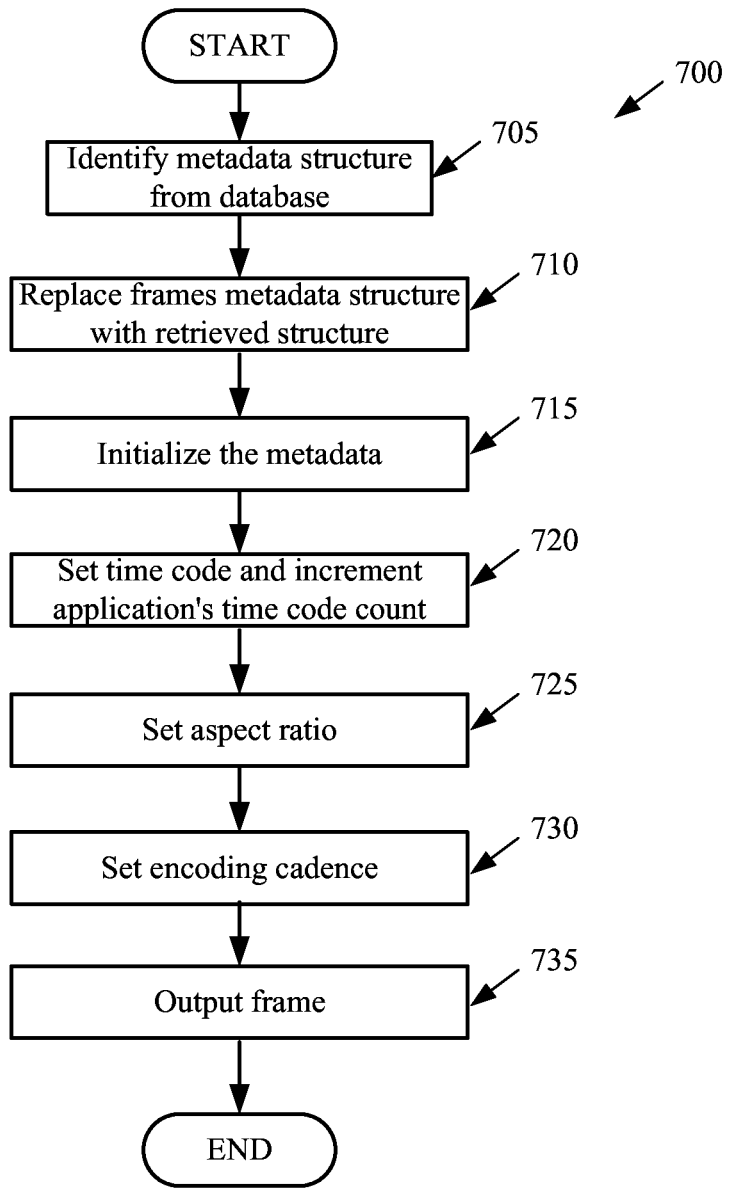
FIG. 7 illustrates a process that is performed by the output engine of the computer system of FIG. 5, in order to encode metadata within a digital video frame that the playback engine of this computer system provides to it.

FIG. 7 illustrates a process 700 that is performed by the output engine 515 of the computer system 500. This process encodes metadata within a digital video frame that the playback engine 510 provides to it. The metadata that this process encodes includes the timecode, aspect ratio, and the encoding cadence (e.g., the native frame rate, frame identifier, and encoding identifier for the 30-fps encoding schemes illustrated in FIG. 2, and the native frame rate and duplicate flag for the 60-fps encoding scheme illustrated in FIG. 2).

As shown in FIG. 7, the process initially identifies (at 705) the metadata structure for the video destination (e.g., for the camera or tape deck) to which the output engine is sending the frame. In some embodiments, the process 700 identifies the metadata structure by retrieving it from the data storage 505, which stores different metadata structures for several different manufacturers.

In some embodiments, a digital video frame includes N DIF sequences, with each sequence including 150 DIF blocks. In these embodiments, each individual element of each DIF block is tagged for different purposes. Some blocks are video data blocks, video auxiliary ("vaux") blocks, audio data blocks, audio auxiliary blocks, subcode blocks, etc. In these embodiments, the metadata is typically embedded in the subcode and vaux blocks. However, different manufacturers place the metadata in different areas of each DIF block.

After identifying the metadata structure at 705, the process then replaces (at 710) any previous metadata structure in the received frame with the metadata structure that it identified at 705. This identified metadata structure might be identical to or different than the original metadata structure that it replaces. The process then initializes (at 715) the metadata parameter values in the newly inserted metadata structure of the frame.

Next, at 720, the output engine obtains a timecode for the frame from the timecode counter 520, sets the timecode of the frame (i.e., records the obtained timecode in the timecode metadata field of the frame), and directs the timecode counter 520 to increment its timecode count. When the computer system 500 starts its output operation (i.e., when the playback engine starts to provide frames to the output engine), the timecode counter retrieves an initial timecode count from the data storage 505. This counter increments its count each time it is directed to do so by the output engine. In this manner, the counter can provide a scrolling timecode to the output engine, which, in turn, records this timecode in each output frame at 720.

After 720, the process 700 retrieves (at 725) the aspect ratio for the frame from the data storage 505. The process records (at 725) this aspect ratio in the aspect-ratio metadata field of the frame. The process then identifies (at 730) the encoding cadence of the frame (e.g., the frame's native frame rate, frame identifier, and encoding identifier for the 30-fps encoding schemes illustrated in FIG. 2, or the frame's native frame rate and duplicate flag for the 60-fps encoding scheme illustrated in FIG. 2). In some embodiments, the process 700 obtains all the encoding-cadence parameters from the playback engine 510. However, in other embodiments, the process 700 might obtain some or all of these parameters differently. For instance, in some embodiments, the process identifies the native frame rate and the encoding identifier based on parameter values that are set in the data storage 505 or based on values entered by the editor. At 730, the process records the frame's encoding-cadence parameters in the corresponding metadata fields of the frame. Finally, at 735, the process 700 outputs the frame, and then ends.

As mentioned above, different manufacturers use different metadata structures (i.e., place the metadata in different areas in the subcode and vaux blocks). Some embodiments of the invention capture two video clips from two different sources that utilize two different metadata structures. These embodiments then generate a third video clip from the first and second video clips. The third clip uses a third metadata format that might be different from one or both of the first and second metadata formats.

Figure 8:
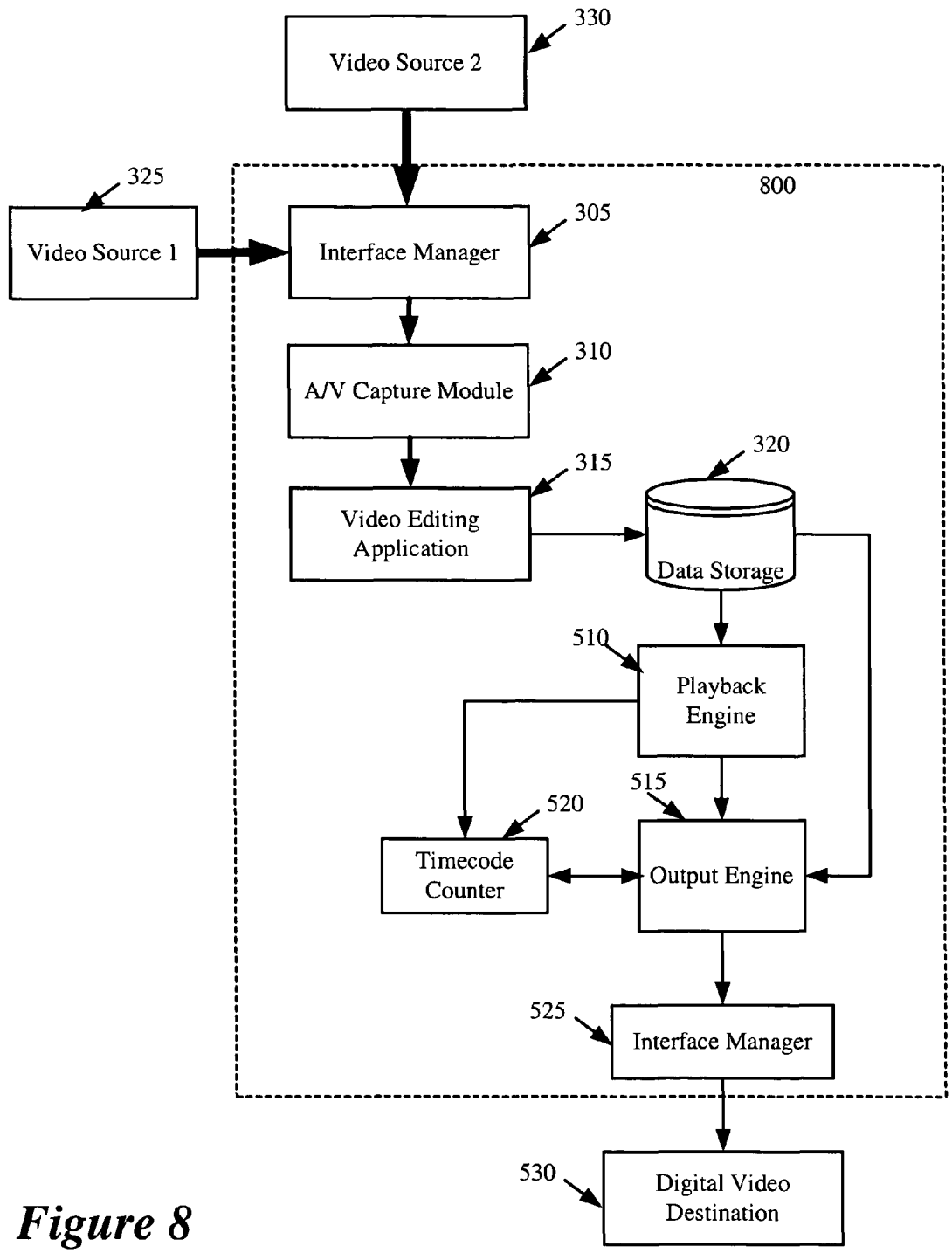
FIG. 8 illustrates a computer system that is a combination of the computer systems 300 and 500 of FIGS. 3 and 5.
Figure 9:
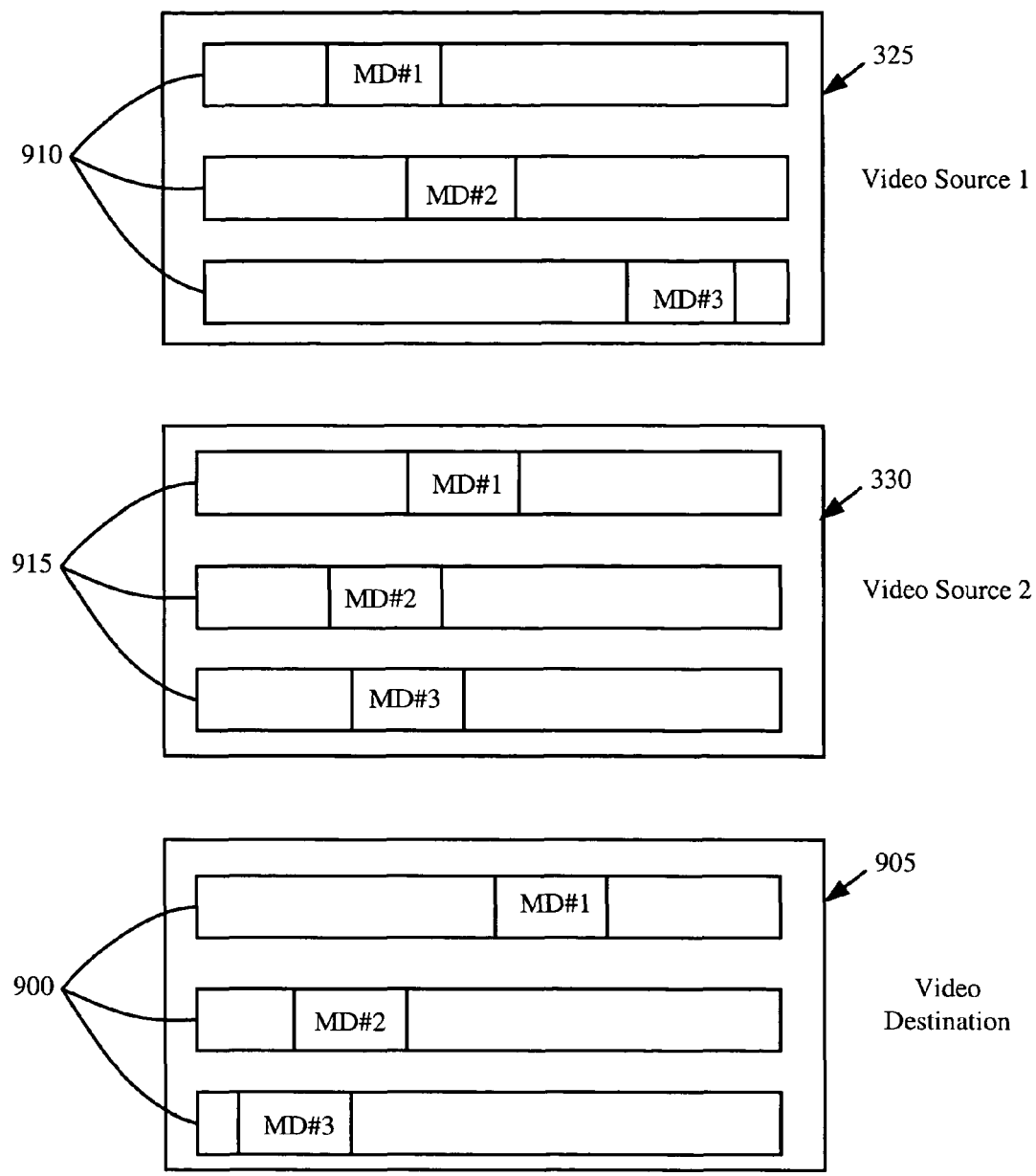
FIG. 9 shows three metadata fields that are stored at three different locations in three different frames.

For instance, FIG. 8 illustrates a computer architecture 800 that is a combination of the computer architectures 300 and 500 of FIGS. 3 and 5. The computer architecture 800 captures two digital video streams from two video sources 325 and 330 through the interface manager 305, capture module 310, and editing application 315. The two video streams 325 and 330 have two different metadata structures 910 and 915, as shown in FIG. 9. Specifically, FIG. 9 shows three metadata fields (MD #1, MD #2, and MD #3) that are stored at three different locations in video sources 325 and 330.

The computer 800 typically captures these video streams one at a time through its interface manager 305. This computer then performs the above-described operations to store each video stream in the data storage 320. An editor can then use the editing application 315 to produce a third digital video clip from the two captured video clips.

The third digital video clip can then be output through the operations of the playback engine 510, output engine 515, timecode counter 520, and the interface manager 525. In some embodiments, the playback engine 510, the output engine 515, and the timecode counter 520 are modules within the video editing application 315. In some embodiments, the interface manager 525 is the same module as the interface manager 305. As mentioned above, the metadata structure that the output engine 515 inserts in each frame of the third digital video clip might be different from one or both of the metadata formats of the first and second video clips 325 and 330. FIG. 9 illustrates an example of a metadata format 900 for a third video clip that is different than the metadata formats of the first and second video clips 325 and 330.

Figure 10:
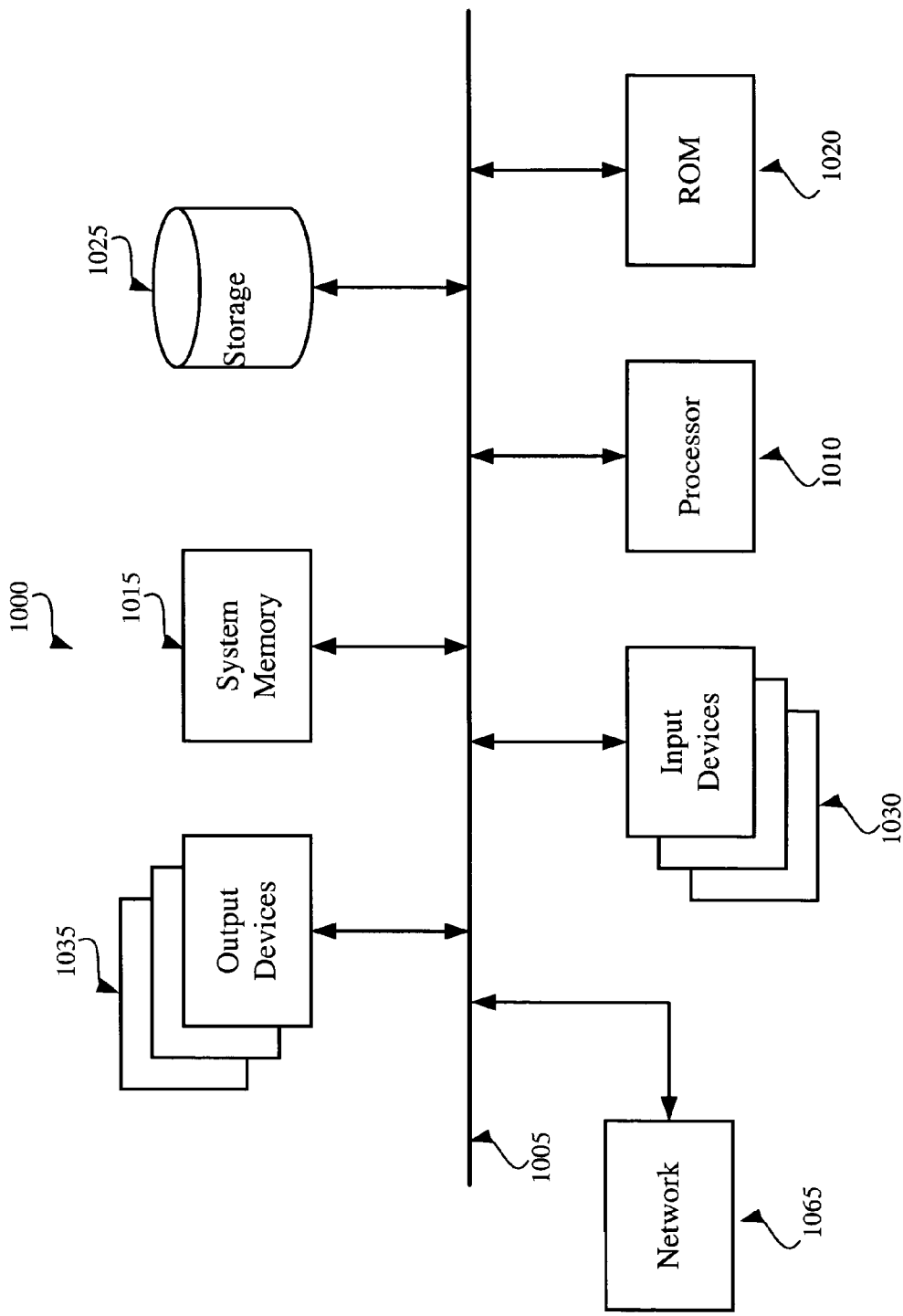
FIG. 10 presents a block diagram that conceptually illustrates the hardware of a computer system with which one embodiment of the invention is implemented.

FIG. 10 presents a block diagram that conceptually illustrates the hardware of a computer system with which one embodiment of the invention is implemented. Computer system 1000 includes a bus 1005, a processor 1010, a system memory 1015, a read-only memory 1020, a permanent storage device 1025, input devices 1030, and output devices 1035. The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025.

From these various memory units, the processor 1010 retrieves instructions to execute and data to process in order to execute the processes of the invention. The read-only-memory (ROM) 1020 stores static data and instructions that are needed by the processor 1010 and other modules of the computer system.

The permanent storage device 1025, on the other hand, is read-and-write memory device. This device is a non-volatile memory unit that stores instruction and data even when the computer system 1000 is off. Some embodiments of the invention use a mass-storage device (such as a magnetic or optical disk and its corresponding disk drive) as the permanent storage device 1025.

Other embodiments use a removable storage device (such as a floppy disk or zip® disk, and its corresponding disk drive) as the permanent storage device. Like the permanent storage device 1025, the system memory 1015 is a read-and-write memory device. However, unlike storage device 1025, the system memory is a volatile read-and-write memory, such as a random access memory. The system memory stores some of the instructions and data that the processor needs at runtime. In some embodiments, the invention's processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include alphanumeric keyboards and cursor-controllers. The output devices 1035 display images generated by the computer system. For instance, these devices display IC design layouts. The output devices include printers and display devices, such as cathode ray tubes (CRT) or liquid crystal displays (LCD).

Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1000 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A non-transitory computer readable medium having a computer program executable by at least one processor, the program comprising sets of instructions for:
   generating, from a first video clip with a first metadata set in a first metadata structure and a second video clip with a second metadata set in a second metadata structure, a third video clip, wherein a metadata structure of a video clip comprises a set of locations in the video clip for embedding metadata;
   identifying an output destination device of the third video clip;
   selecting, for the identified output destination device, a third metadata structure from a plurality of different metadata structures, the third metadata structure different from at least one of the first and second metadata structures; and
   using the third metadata structure to embed a third metadata set in the third video clip for the identified output destination device to use.

2. The non-transitory computer readable medium of claim 1, wherein the third video clip comprises a plurality of frames, wherein the set of instructions for using the third metadata structure comprises a set of instructions for inserting the third metadata structure into each frame of the third video clip.

3. The non-transitory computer readable medium of claim 1, wherein the computer program further comprises a set of instructions for outputting the third video clip to the identified output destination device.

4. The non-transitory computer readable medium of claim 3, wherein the third video clip includes a plurality of frames, wherein the computer program further comprises a set of instructions for inserting the third metadata structure into each frame while outputting each frame to the identified output destination device.

5. The non-transitory computer readable medium of claim 3, wherein the computer program further comprises a set of instructions for storing the third video clip at a first frame rate, wherein the set of instructions for outputting of the third video clip comprises a set of instructions for outputting the third video clip at a second frame rate that is different from the first frame rate.

6. The non-transitory computer readable medium of claim 5, wherein the identified output destination device captured one of the first and second video clips.

7. The non-transitory computer readable medium of claim 5, wherein the first frame rate is a native frame rate at which the first video clip was shot by a video camera and the second frame rate is an output frame rate.

8. The non-transitory computer readable medium of claim 7, wherein the third metadata set comprises an encoding cadence for allowing the third video clip to be converted from the output frame rate to the native frame rate.

9. The non-transitory computer readable medium of claim 1, wherein the third metadata set comprises at least one of a time code, a setting of a video camera, temporal data related to when the first or second video clip was captured by the video camera, a frame rate that identifies a native frame rate at which the video clip was captured by the video camera, and encoding data related to how the video clip was encoded.

10. The non-transitory computer readable medium of claim 1, wherein the computer program further comprises:
a set of instructions for extracting the first metadata set from the first video clip; and
a set of instructions for identifying a set of locations in the third metadata structure to embed a subset of the first metadata set as part of the third metadata set in the third video clip.

11. The non-transitory computer readable medium of claim 1, wherein the identified output destination device is a video playback device that utilizes the third metadata structure to identify the third metadata set in the third video clip.

12. The non-transitory computer readable medium of claim 1, wherein the output destination device is a digital video playback device, wherein the plurality of different metadata structures are associated with a plurality of different manufacturers of digital video playback devices, wherein the set of instructions for identifying comprises a set of instructions for identifying a manufacturer of the digital video playback device, wherein the set of instructions for selecting the third metadata structure comprises a set of instructions for selecting the third metadata structure for the identified manufacturer.

13. The non-transitory computer readable medium of claim 1, wherein the computer program further comprises a set of instructions for maintaining a counter in order to embed time code metadata as part of the third metadata set in the third video clip.

14. The non-transitory computer readable medium of claim 13, wherein the computer program further comprises a set of instructions for retrieving an initial time code from a data store to embed an initial time code metadata as part of the third metadata set in the third video clip.

15. The non-transitory computer readable medium of claim 1, wherein the computer program further comprises a set of instructions for identifying an aspect ratio for the third video clip to embed the aspect ratio as part of the third metadata set in the third video clip.

16. The non-transitory computer readable medium of claim 1, wherein the computer program is a video editing application for generating the third video clip by compositing the first and second video clips.

17. The non-transitory computer readable medium of claim 1, wherein the plurality of different metadata structures specify different sets of metadata locations for different devices.

18. The non-transitory computer readable medium of claim 1, wherein the third metadata structure is different from both the first and second metadata structures.

19. A method of embedding a metadata structure in a video clip, the method comprising:
from a first video clip with a first metadata set in a first metadata structure and a second video clip with a second metadata set in a second metadata structure, generating a third video clip, wherein a metadata structure of a video clip comprises a set of locations in the video clip for embedding metadata;
identifying an output destination device of the third video clip;
for the identified output destination device, selecting a third metadata structure from a plurality of different metadata structures, the third metadata structure different from at least one of the first and second metadata structures; and
using the third metadata structure to embed a third metadata set in the third video clip for the identified output destination device to use.

20. The method of claim 19, wherein the output destination device is a device that captured the first video clip and the third metadata structure is identical to the first metadata structure.

21. The method of claim 19, wherein the plurality of different metadata structures specify different sets of metadata locations for different devices.

* * * * *